(12) United States Patent
Gibbons et al.

(10) Patent No.: US 8,972,655 B2
(45) Date of Patent: Mar. 3, 2015

(54) INITIALIZATION OF A STORAGE DEVICE (71) Applicant: Western Digital Technologies, Inc., Irvine, CA (US)

(72) Inventors: Kent W. Gibbons, Yorba Linda, CA (US); Dean V. Dang, Fountain Valley, CA (US)

(73) Assignee: Western Digital Technolgies, Inc., Irvine, CA (US)

( * ) Notice: Subject to any disclaimer, the term of this patent is extended or adjusted under 35 U.S.C. 154(b) by 219 days.

(21) Appl. No.: 13/754,854

(22) Filed: Jan. 30, 2013

(65) Prior Publication Data

US 2014/0208026 A1    Jul. 24, 2014

Related U.S. Application Data (60) Provisional application No. 61/754,879, filed on Jan. 21, 2013.

(51) Int. Cl.
*G06F 12/00*    (2006.01)
*G06F 13/14*    (2006.01)
*G06F 12/08*    (2006.01)
*G06F 12/16*    (2006.01)
*G06F 3/06*    (2006.01)
*G06F 12/02*    (2006.01)
*G06F 12/06*    (2006.01)

(52) U.S. Cl.
CPC ............... *G06F 12/08* (2013.01); *G06F 12/16* (2013.01); *G06F 3/0632* (2013.01); *G06F 12/0292* (2013.01); *G06F 12/0653* (2013.01); *G06F 2212/217* (2013.01)
USPC .......................................... 711/112; 711/103

(58) Field of Classification Search
None
See application file for complete search history.

(56) References Cited

U.S. PATENT DOCUMENTS

| | | |
|---|---|---|
| 6,856,556 B1 | 2/2005 | Hajeck |
| 7,126,857 B2 | 10/2006 | Hajeck |
| 7,430,136 B2 | 9/2008 | Merry, Jr. et al. |
| 7,447,807 B1 | 11/2008 | Merry et al. |
| 7,502,256 B2 | 3/2009 | Merry, Jr. et al. |
| 7,509,441 B1 | 3/2009 | Merry et al. |

(Continued)

FOREIGN PATENT DOCUMENTS

WO    2012105811 A2    8/2012

OTHER PUBLICATIONS

International Search Report dated May 8, 2014, from PCT/US2014/012399, filed Jan. 21, 2014, 3 pages.

(Continued)

*Primary Examiner* — Kevin Verbrugge (57) ABSTRACT

A storage device including a first storage unit including a first media of a first type, a second storage unit including a second media of a second type, and a controller. The controller initializes the storage device for a host by receiving an initialization query from the host, identifying, to the host, that the storage device comprises the second storage unit but not the first storage unit, receiving an indication from the host indicating that the host is compatible with the first storage unit, and identifying, to the host, that the storage device comprises the first storage unit and the second storage unit. The host initializes the storage device by initializing the second storage unit, transmitting the indication to the controller indicating that the host is compatible with the first storage unit, receiving the identification of the first storage unit from the controller, and initializing the first storage unit.

42 Claims, 8 Drawing Sheets

(56) References Cited

U.S. PATENT DOCUMENTS

| | | | |
|---|---|---|---|
| 7,596,643 B2 | 9/2009 | Merry, Jr. et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2006/0248302 A1 | 11/2006 | Yamamoto et al. |
| 2010/0174849 A1 | 7/2010 | Walston et al. |
| 2010/0250793 A1 | 9/2010 | Syu |
| 2011/0072173 A1 | 3/2011 | Holty et al. |
| 2011/0099323 A1 | 4/2011 | Syu |
| 2011/0283049 A1 | 11/2011 | Kang et al. |
| 2011/0296130 A1 | 12/2011 | Abe et al. |
| 2012/0131263 A1 | 5/2012 | Yeh |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

OTHER PUBLICATIONS

Written Opinion dated May 8, 2014, from PCT/US2014/012399, filed Jan. 21, 2014, 4 pages.

INITIALIZATION OF A STORAGE DEVICE

CROSS-REFERENCE TO RELATED APPLICATIONS

This application claims the benefit of U.S. Provisional Application No. 61/754,879, filed on Jan. 21, 2013, entitled "INITIALIZATION OF A STORAGE DEVICE," which is hereby incorporated by reference in its entirety.

BACKGROUND

A conventional hybrid drive may include both a rotating disk and a solid state memory. In operation the hybrid drive is connected to a host for use by the host to store data. In some cases, the host may not be configured to utilize the solid state memory. In such cases, the host may not be able to utilize the hybrid drive and may generate an error. However, in some cases, the host will attempt to utilize the hybrid drive, even though the host is not configured to utilize the solid state memory. This can lead, for example, to compatibility issues and even data loss.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
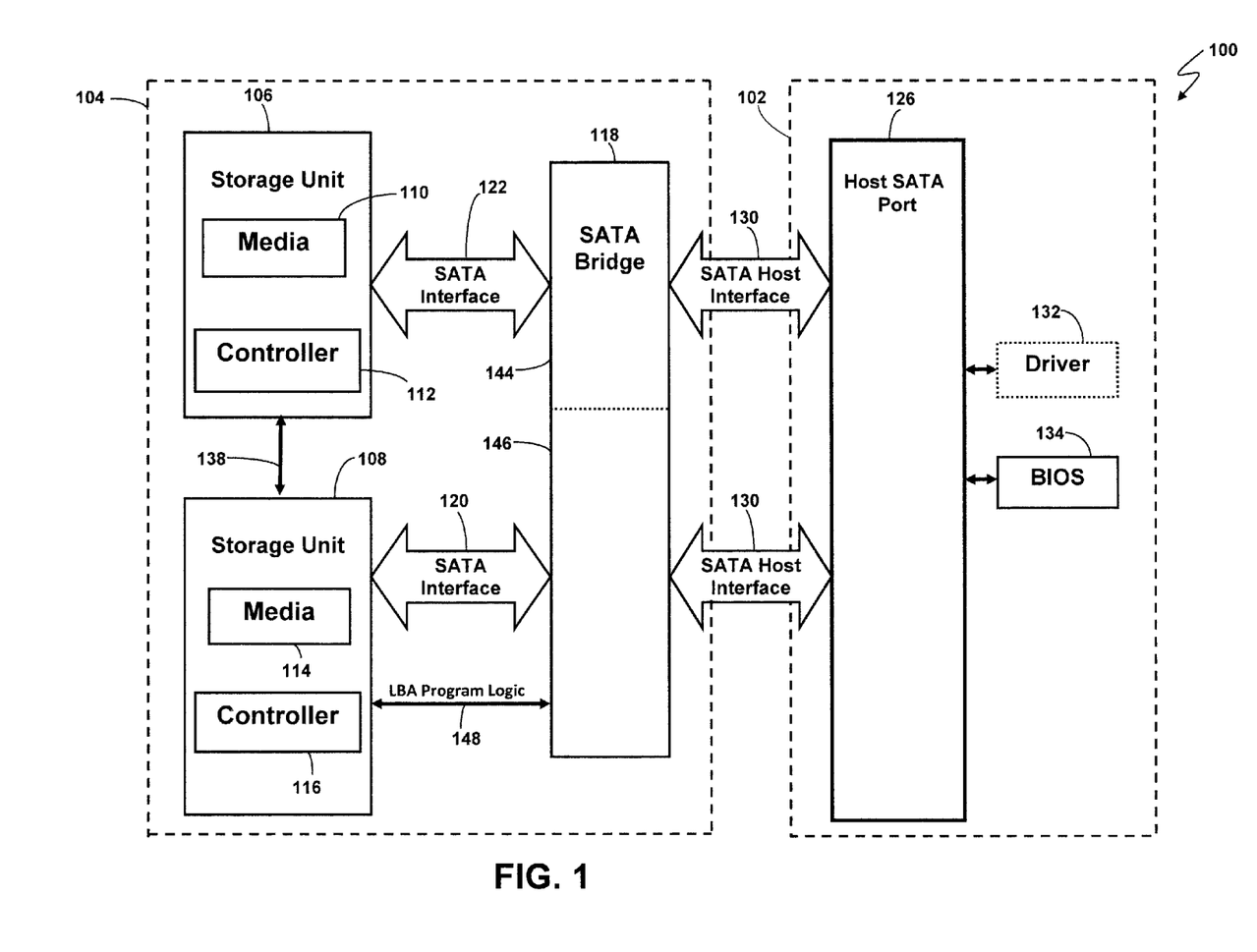
FIG. 1 depicts a system including a host and a storage device according to an embodiment.

In an embodiment, as shown in FIG. 1, a system 100 comprises a host 102 and a storage device 104. In an embodiment, the system 100 comprises a computing device, a mobile device, or other types of electrical systems. In an embodiment, the host 102 comprises a host Serial Advanced Technology Attachment ("SATA") port 126, and a Basic Input/Output System ("BIOS") 134. Furthermore, a driver 132 may be installed on the host 102, which will be described in more detail later. In an embodiment, the driver 132 is a device driver. The host 102 communicates with the storage device 104 using the host SATA port 126 and a SATA host interface 130.

The storage device 104 comprises two or more storage units such as a storage unit 106 and a storage unit 108. The storage device 104 also comprises a SATA bridge 118.

In an embodiment, the storage unit 106 comprises a media 110 and a controller 112, while the storage unit 108 comprises a media 114 and a controller 116. In an embodiment, the storage unit 108 communicates with the storage unit 106 using a signal line 138. In an embodiment, the controller 116 programs or controls the storage unit 106 utilizing the signal line 138.

In an embodiment, the media 110 is a first type of media, while the media 114 is a second type of media different than the first type of media. In an embodiment, the first type of media has a different access time than the second type of media. In an embodiment, the first type of media has a lower access time than the second type of media. In an embodiment, the first type of media has a different latency than the second type of media. In an embodiment, the first type of media has a lower latency than the second type of media. In an embodiment, the first type of media and the second type of media are configured to store data persistently. In an embodiment, the media 110 is a solid state memory while the media 114 is a rotating disk. The rotary disk can be, for example, a magnetic rotating disk. In another embodiment, the media 110 and media 114 may both comprise solid state memory, but of different types.

While the description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Figure 2:
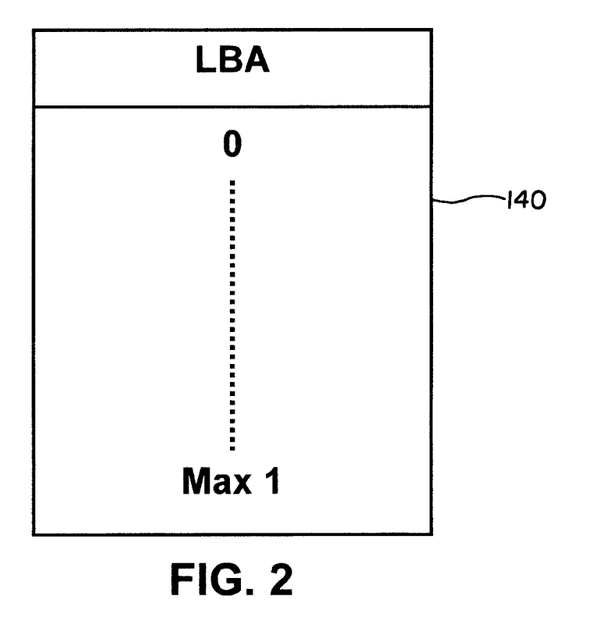
FIG. 2 depicts a set of logical block addresses for a storage unit according to an embodiment.
Figure 3:
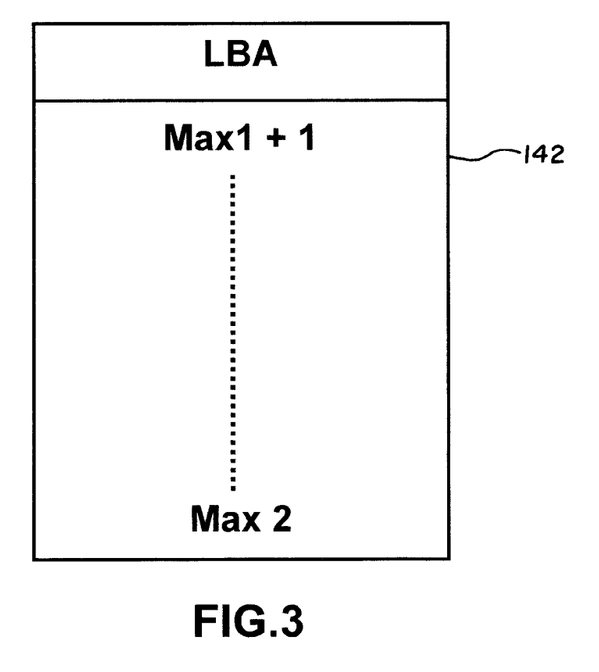
FIG. 3 depicts a set of logical block addresses for a storage unit according to an embodiment.

In an embodiment, the media 114 comprises a set of logical block addresses 140 as shown in FIG. 2, while the media 110 comprises a set of logical block addresses 142 shown in FIG. 3. In an embodiment shown in FIG. 2, the set of logical block addresses 140 comprises logical block addresses from 0 to Max 1. In an embodiment shown in FIG. 3, the set of logical block addresses 142 comprises logical block addresses located after logical block addresses of the set of logical block addresses 140. For example, the set of logical block addresses 142 comprises logical block addresses Max 1+1 to Max 2. In an embodiment, the logical block address Max 1+1 is a logical block address located after the logical block address Max 1.

In an embodiment, the storage unit 106 and the storage unit 108 communicate with the SATA bridge 118 using a SATA interface 122 and a SATA interface 120, respectively.

In an embodiment, the SATA bridge 118 comprises a first SATA bridge portion 144 and a second SATA bridge portion 146. The SATA bridge 118 can be, for example, an interface between the storage unit 106 and the host 102, and an interface between the storage unit 108 and the host 102. In an embodiment, the SATA bridge 118 is configured to transmit data between the storage unit 106 and the host 102, and to transmit data between the storage unit 108 and the host 102.

In an embodiment, the first SATA bridge portion 144 is configured to transmit first storage unit data between the host 102 and the storage unit 106. The first storage unit data can be, for example, data from the host 102 intended for the storage unit 106. In an embodiment, the second SATA bridge portion 146 is configured to transmit second storage unit data between the host 102 and the storage unit 108. The second storage unit data can be, for example, data from the host 102 intended for the storage unit 108.

Furthermore, in an embodiment, the storage unit 108 communicates with the SATA bridge 118 regarding logical block address ("LBA") program logic using a LBA program logic signal line 148. For example, the controller 116 can communicate with the SATA bridge 118 regarding LBA program logic using the LBA program logic signal line 148. In an embodiment, the storage unit 108 can control or program the SATA bridge 118 using the LBA program logic signal line 148. For example, the controller 116 can control or program the SATA bridge 118 using the LBA program logic signal line 148. In an embodiment, the SATA bridge 118 comprises registers and the controller 116 configures the SATA bridge 118 by modifying the registers in the SATA bridge 118.

Figure 4:
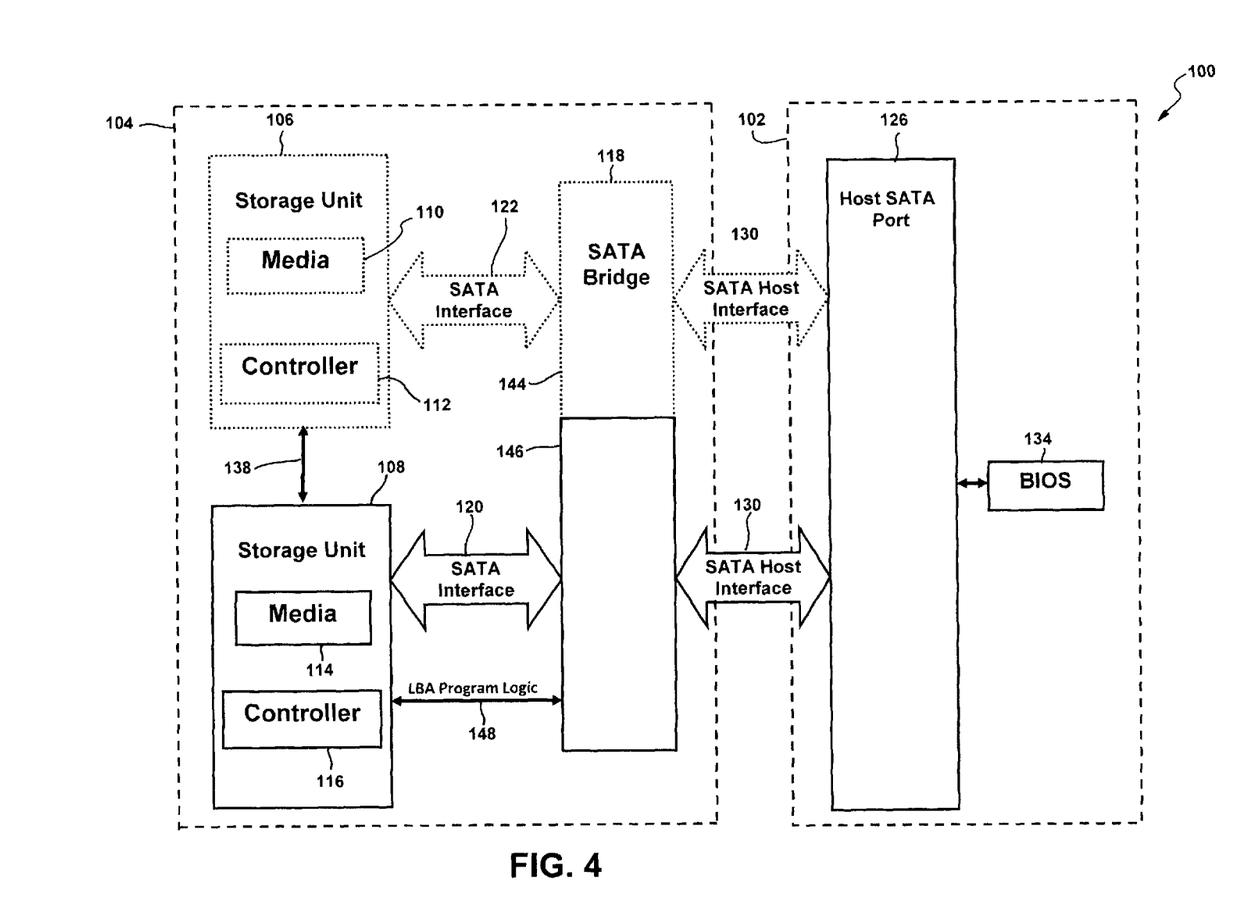
FIG. 4 depicts a system including a host and a storage device when a driver is not loaded on the host according to an embodiment.
Figure 5:
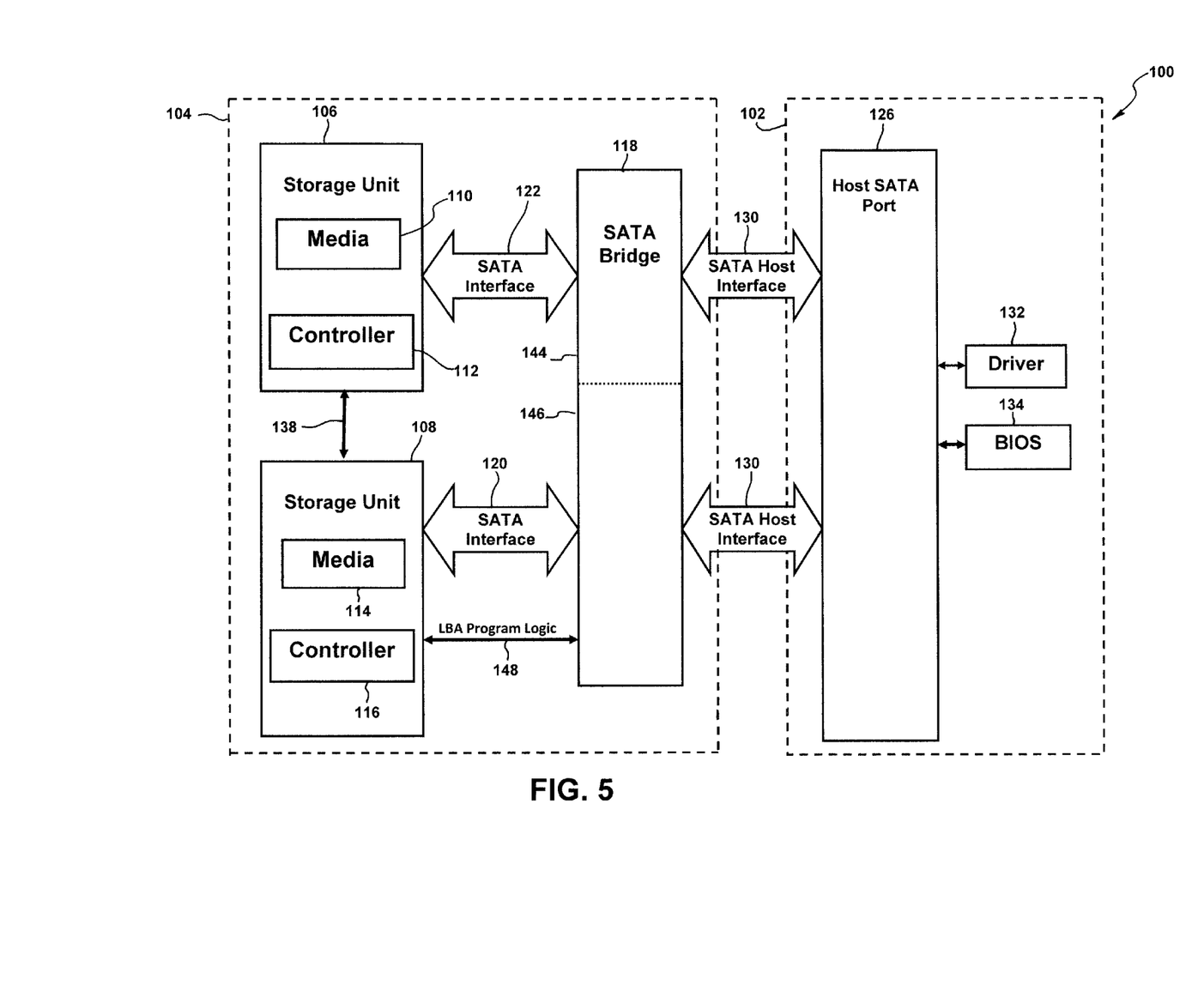
FIG. 5 depicts a system including a host and a storage device when a driver is loaded on the host according to an embodiment.

In an embodiment, as seen in FIG. 4, the storage unit 106 is not identified to the host 102 when the driver 132 is not installed in the host 102, which will be described in more detail below. In an embodiment, as shown in FIG. 4, the first SATA bridge portion 144 is also not identified to the host 102 when the driver 132 is not installed in the host 102. In an embodiment, this can prevent the host 102 from utilizing the storage unit 106 when the host 102 is not configured to utilize the first type of media for the media 110. In an embodiment, as seen in FIG. 5, the storage unit 106 is identified to the host 102 when the driver 132 is installed in the host 102, which will be described in more detail below. In an embodiment, this allows the host 102 to utilize the storage unit 106 when the host 102 is configured to utilize the first type of media for the media 110. For example, in an embodiment where the storage device is a hybrid drive comprising a solid state memory and a rotating media, the hybrid drive may not identify the solid state memory to the host until a driver is installed onto the host and configuring the host to use the solid state memory.

Figure 6:
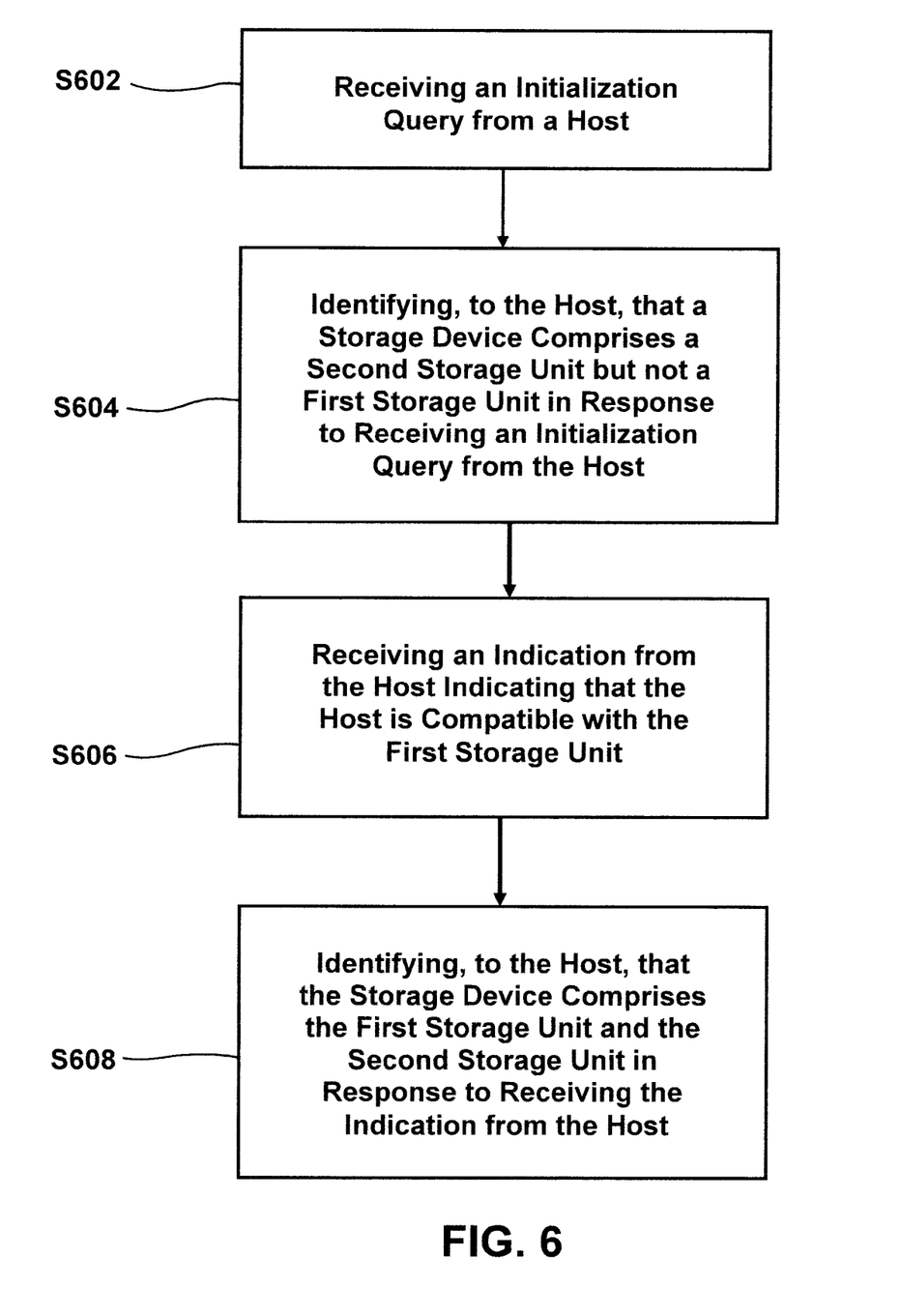
FIG. 6 depicts a process for a storage device according to an embodiment.

In an embodiment, a process for the storage device 104 is shown in FIG. 6. In block S602, the controller 116 receives an initialization query from the host 102. For example, the initialization query can request an identification of storage units available in the storage device 104.

In block S604, the controller 116 identifies to the host 102 that the storage device 104 comprises a second storage unit, such as the storage unit 108, but not a first storage unit, such as the storage unit 106, in response to receiving the initialization query from the host 102. For example, as seen in an embodiment shown in FIG. 4, the storage unit 106 has not been identified to the host 102. In an embodiment, this prevents the host 102 from utilizing the storage unit 106 because the host 102 will not know about the existence of the storage unit 106. This can prevent, for example, the host 102 from utilizing the storage unit 106 when the host 102 is not configured to utilize the first type of media for the media 110.

In block S606, the controller 116 receives an indication from the host 102 indicating that the host 102 is compatible with the storage unit 106. For example, the controller 116 can receive an indication from the host 102 indicating that the host 102 is capable of utilizing the storage unit 106 and the first type of media for the media 110. In an embodiment, the indication is received from the driver 132 when the driver 132 is installed on the host 102. In an embodiment the indication comprises a signature.

In block S608, the controller 116 identifies to the host 102 that the storage device 104 comprises the storage unit 106 and the storage unit 108 in response to receiving the indication from the host 102. For example, as seen in an embodiment shown in FIG. 5, both the storage unit 106 and the storage unit 108 have been identified to the host 102.

Figure 7:
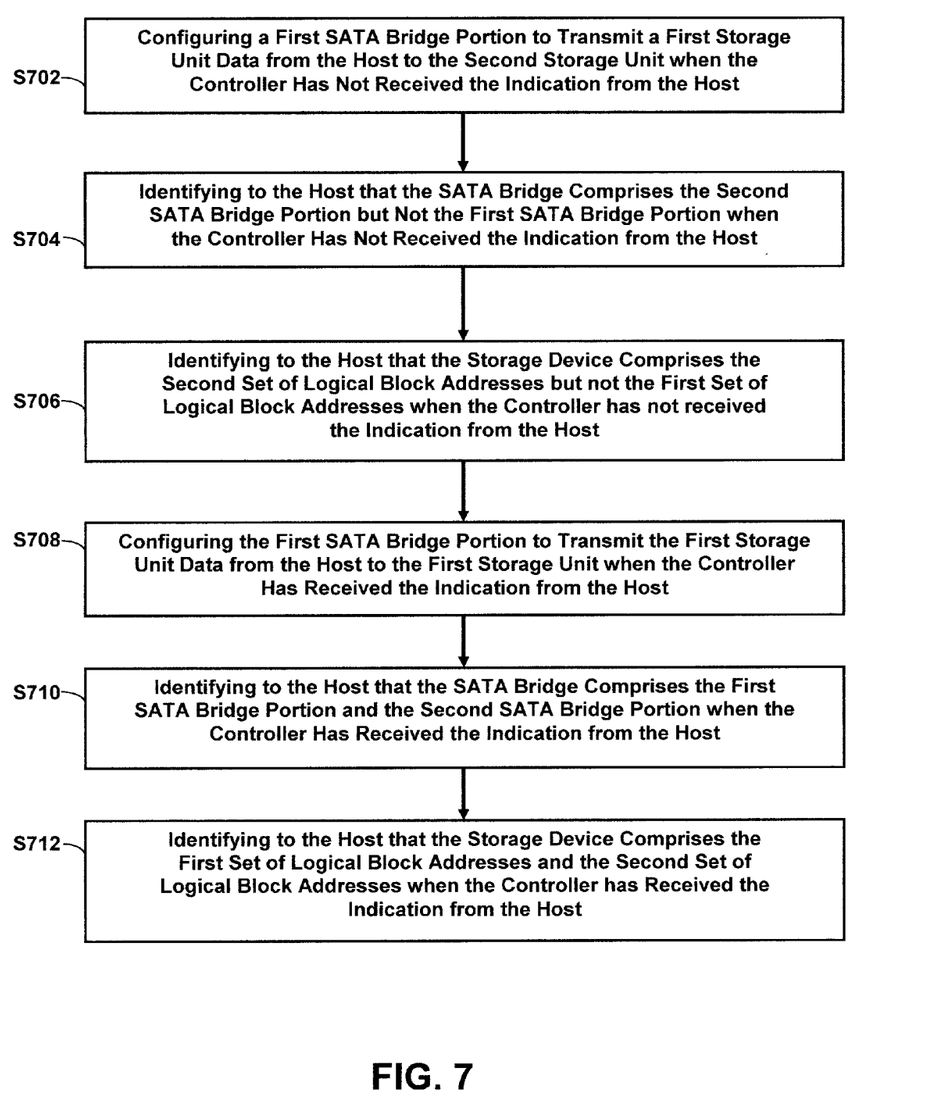
FIG. 7 depicts additional processes for a storage device according to an embodiment.

In an embodiment, additional processes for the storage device 104 are shown in FIG. 7. In block S702, the controller 116 configures the first SATA bridge portion 144 to transmit the first storage unit data from the host 102 to the storage unit 108 when the controller 112 has not received the indication from the host 102. In an embodiment, this provides additional safeguards to prevent the host 102 from utilizing the storage unit 106 before the host 102 indicates that the host 102 is configured to utilize the storage unit 106, since the first storage unit data is re-routed by the first SATA bridge portion 144 to the storage unit 108 instead of being transmitted to the storage unit 106.

In block S704, the controller 116 identifies to the host 102 that the SATA bridge 118 comprises the second SATA bridge portion 146, but not the first SATA bridge portion 144 when the controller 116 has not received the indication from the host 102. For example, as seen in an embodiment shown in FIG. 4, the second SATA bridge portion 146, but not the first SATA bridge portion 144 is identified to the host 102. In an embodiment, this provides additional safeguards to prevent the host 102 from utilizing the storage unit 106 before the host 102 indicates that the host 102 is configured to utilize the storage unit 106, since the host 102 will not know about the existence of the first SATA bridge portion 144.

In block S706, the controller 116 identifies to the host 102 that the storage device 104 comprises a second set of logical block addresses, such as the set of logical block addresses 140 (FIG. 2), but not the first set of logical block addresses, such as the set of logical block addresses 142 (FIG. 3) when the controller 116 has not received the indication from the host 102. In an embodiment, this provides additional safeguards to prevent the host 102 from utilizing the storage unit 106 before the host 102 indicates that the host 102 is configured to utilize the storage unit 106, since the host 102 will not know about the set of logical block addresses 140 in the storage unit 106. In some embodiments, one or more of S702, S704, and S706 may be performed to prevent usage of the storage unit 106 by the host until the host is configured to use the storage unit 106.

In block S708, the controller 116 configures the first SATA bridge portion 144 to transmit the first storage unit data from the host 102 to the storage unit 106 when the controller 116 has received the indication from the host 102. In block S710, the controller 116 identifies to the host 102 that the SATA bridge 118 comprises the first SATA bridge portion 144 and the second SATA bridge portion 146 when the controller 116 has received the indication from the host 102. For example, in an embodiment shown in FIG. 5, the first SATA bridge portion 144 and the second SATA bridge portion 146 are identified to the host 102 when the driver 132 is installed on the host 102 and the controller 116 receives the indication from the driver 132.

In block S712, the controller 116 identifies to the host 102 that the storage device 104 comprises the set of logical block addresses 142 (FIG. 3) and the set of logical block addresses 140 (FIG. 2) when the controller 116 has received the indication from the host 102.

Although in FIGS. 6 and 7, the controller 116 in the storage unit 108 is disclosed as being utilized for the initialization of the storage device 104, in an embodiment, a separate controller from the storage unit 108 is utilized in addition or instead of the controller 116. Furthermore, in an embodiment, the controller 116 need not be part of the storage unit 108. For example, the controller 116 can be part of the storage device 104 but not part of the storage unit 108.

Figure 8:
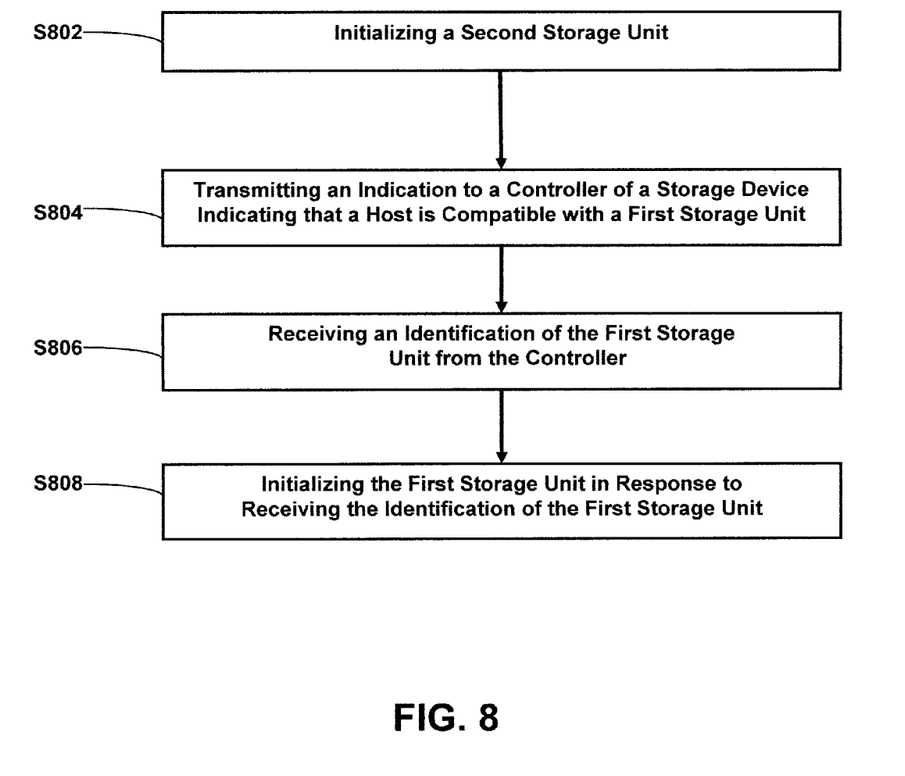
FIG. 8 depicts a process for a host according to an embodiment.

In an embodiment, a process for the host 102 is shown in FIG. 8. In block S802, the host 102 initializes the storage unit 108. For example, the BIOS 134 in the host 102 initializes the storage unit 108 as shown in an embodiment in FIG. 1.

In block S804, the host 102 transmits the indication to the controller 116 of the storage unit 108 indicating that the host 102 is compatible with the storage unit 106. For example, once the driver 132 is loaded onto the host 102, the driver 132 can transmit the indication to the controller 116 as shown in an embodiment in FIG. 5.

In block S806, the host 102 receives an identification of the storage unit 106 from the controller 116. In block S808, the host 102 initializes the storage unit 106 in response to receiving the identification of the storage unit 106.

Figure 9:
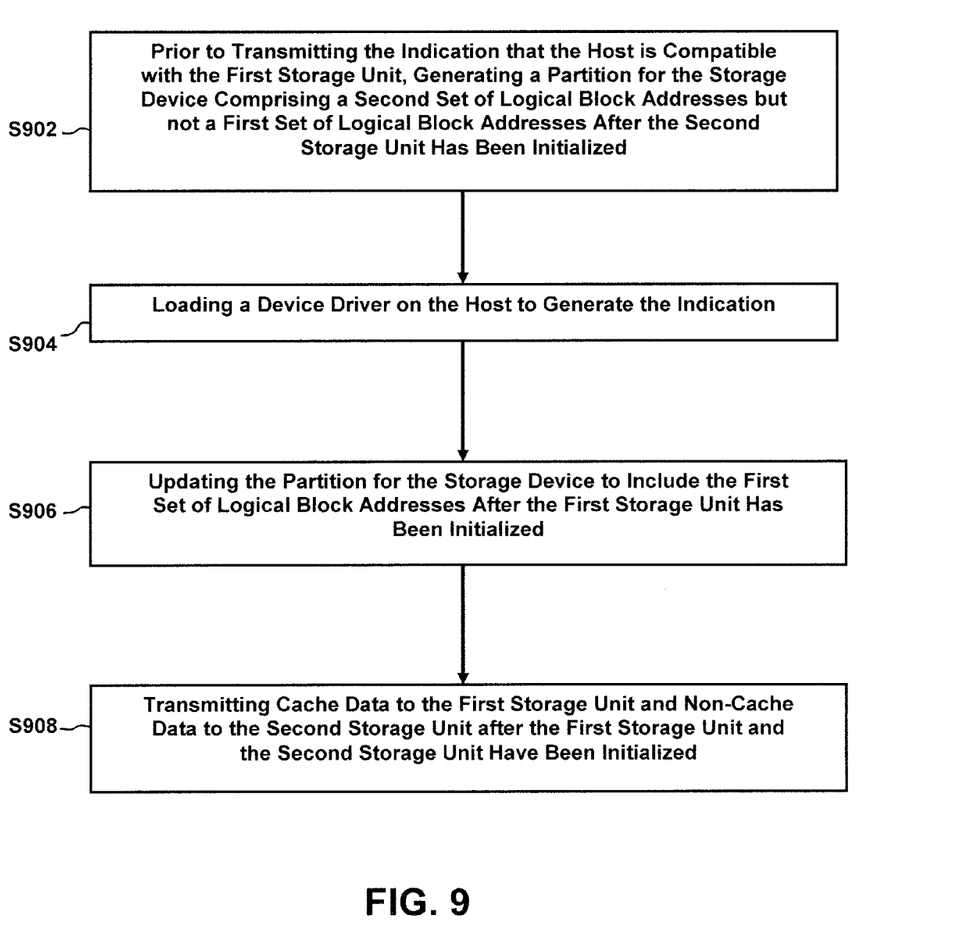
FIG. 9 depicts additional processes for a host according to an embodiment.

In an embodiment, additional processes for the host 102 are shown in FIG. 9. In block S902, prior to transmitting the indication that the host 102 is compatible with the storage unit 106, the host 102 generates a partition for the storage device 104 comprising the set of logical block addresses 140 (FIG. 2) but not the set of logical block addresses 142 (FIG. 3), after the storage unit 106 has been initialized.

In block S904, the host 102 loads a device driver such as the driver 132 on the host 102 to generate the indication. In block S906, the host 102 updates the partition for the storage device 104 to include the set of logical block addresses 142 after the storage unit 106 has been initialized. Thus, the partition will now include the set of logical block addresses 140 (FIG. 2) and the set of logical block addresses 142 (FIG. 3).

In block S908, the host 102 transmits cache data to the storage unit 106 and non-cache data to the storage unit 108 after the storage unit 106 and the storage unit 108 have been initialized. In an embodiment, the host 102 need not transmit only cache data to the storage unit 106 and non-cache data to the storage unit 108 after the storage unit 106 and the storage unit 108 have been initialized. Instead, the host 102 can be configured to store different types of data in the storage unit 106 and the storage unit 108 after the storage unit 106 and the storage unit 108 have been initialized. For example, the host 102 can store hibernate data or fast cache data to the storage unit 106 when the storage unit 106 and the storage unit 108 have been initialized. In an embodiment, the host 102 utilizes the storage unit 106 as a special purpose partition.

In an embodiment, the host 102 comprises a processor, and one or more features disclosed in the blocks shown in FIGS. 8 and 9 may be performed by the processor. In an embodiment, the driver 132 need not be a device driver, but instead could be a BIOS, software, or application that is configured to interface between the host 102 and the storage device 104, which comprises a storage device comprising the first type of media, or comprises the storage unit 106.

In an embodiment, although the SATA bridge 118, the SATA interfaces 120 and 122, and the SATA host interface 130 were utilized in the examples disclosed above, other types of bridges and interfaces may be used.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A storage device comprising:
a first storage unit comprising a first media of a first type;
a second storage unit comprising a second media of a second type different than the first type; and
a controller configured to initialize the storage device for a host by at least:
receiving an initialization query from the host;
identifying, to the host, that the storage device comprises the second storage unit but not the first storage unit in response to receiving the initialization query from the host;
receiving an indication from the host indicating that the host is compatible with the first storage unit; and
identifying, to the host, that the storage device comprises the first storage unit and the second storage unit in response to receiving the indication from the host.

2. The storage device of claim 1 further comprising a SATA bridge comprising:
a first SATA bridge portion configured to transmit first storage unit data between the host and the first storage unit, wherein the first storage unit data is data from the host intended for the first storage unit; and
a second SATA bridge portion configured to transmit second storage unit data between the host and the second storage unit, wherein the second storage unit data is data from the host intended for the second storage unit.

3. The storage device of claim 2 wherein the controller is further configured to initialize the storage device by:
configuring the first SATA bridge portion to transmit the first storage unit data from the host to the second storage unit when the controller has not received the indication from the host.

4. The storage device of claim 2 wherein the controller is further configured to initialize the storage device by:
configuring the first SATA bridge portion to transmit the first storage unit data from the host to the first storage unit when the controller has received the indication from the host.

5. The storage device of claim 2 wherein the controller is further configured to initialize the storage device by:
identifying to the host that the SATA bridge comprises the second SATA bridge portion but not the first SATA bridge portion when the controller has not received the indication from the host.

6. The storage device of claim 2 wherein the controller is further configured to initialize the storage device by:
identifying to the host that the SATA bridge comprises the first SATA bridge portion and the second SATA bridge portion when the controller has received the indication from the host.

7. The storage device of claim 1 wherein the first media comprises a first set of logical block addresses, and the second media comprises a second set of logical block addresses, wherein the first set of logical block addresses comprises logical block addresses after logical block addresses of the second set of logical block addresses.

8. The storage device of claim 7 wherein the controller is further configured to initialize the storage device by:
identifying to the host that the storage device comprises the second set of logical block addresses but not the first set of logical block addresses when the controller has not received the indication from the host.

9. The storage device of claim 7 wherein the controller is further configured to initialize the storage device by:
identifying to the host that the storage device comprises the first set of logical block addresses and the second set of logical block addresses when the controller has received the indication from the host.

10. The storage device of claim 1 wherein the first media comprises a solid state memory and the second media comprises a rotating disk.

11. The storage device of claim 1 wherein the controller is part of the second storage unit.

12. The storage device of claim 1 wherein the indication is received from a device driver installed on the host.

13. The storage device of claim 1 wherein the indication comprises a signature.

14. A method for initializing a storage device comprising a first storage unit comprising a first media of a first type, a second storage unit comprising a second media of a second type different than the first type, and a controller configured to initialize the storage device for a host, the method comprising:
receiving an initialization query from the host;
identifying, to the host, that the storage device comprises the second storage unit but not the first storage unit in response to receiving the initialization query from the host;
receiving an indication from the host indicating that the host is compatible with the first storage unit; and
identifying, to the host, that the storage device comprises the first storage unit and the second storage unit in response to receiving the indication from the host.

15. The method of claim 14 wherein the storage device further comprises a SATA bridge comprising:
a first SATA bridge portion configured to transmit first storage unit data between the host and the first storage unit, wherein the first storage unit data is data from the host intended for the first storage unit; and
a second SATA bridge portion configured to transmit second storage unit data between the host and the second storage unit, wherein the second storage unit data is data from the host intended for the second storage unit.

16. The method of claim 15 further comprising configuring the first SATA bridge portion to transmit the first storage unit data from the host to the second storage unit when the indication has not been received from the host.

17. The method of claim 15 further comprising configuring the first SATA bridge portion to transmit the first storage unit data from the host to the first storage unit when the indication has been received from the host.

18. The method of claim 15 further comprising identifying to the host that the SATA bridge comprises the second SATA bridge portion but not the first SATA bridge portion when the indication has not been received from the host.

19. The method of claim 15 further comprising identifying to the host that the SATA bridge comprises the first SATA bridge portion and the second SATA bridge portion when the indication has been received from the host.

20. The method of claim 14 wherein the first media comprises a first set of logical block addresses, and the second media comprises a second set of logical block addresses, wherein the first set of logical block addresses comprises logical block addresses after logical block addresses of the second set of logical block addresses.

21. The method of claim 20 further comprising identifying to the host that the storage device comprises the second set of logical block addresses but not the first set of logical block addresses when the indication has not been received from the host.

22. The method of claim 20 further comprising identifying to the host that the storage device comprises the first set of logical block addresses and the second set of logical block addresses when the indication has been received from the host.

23. The method of claim 22 wherein the first media comprises a solid state memory and the second media comprises a rotating disk.

24. The method of claim 14 wherein the controller is part of the second storage unit.

25. The method of claim 14 wherein the indication is received from a device driver installed on the host.

26. The method of claim 14 wherein the indication comprises a signature.

27. A method for initializing a storage device configured to communicate with a host, wherein the storage device comprises a first storage unit comprising a first media of a first type, and a second storage unit comprising a second media of a second type different than the first type, and a controller, the method comprising:
initializing the second storage unit;
transmitting an indication to the controller of the storage device indicating that the host is compatible with the first storage unit;
receiving an identification of the first storage unit from the controller; and
initializing the first storage unit in response to receiving the identification of the first storage unit,
wherein the method is performed by a processor in the host.

28. The method of claim 27 wherein the first media comprises a first set of logical block addresses, and the second media comprises a second set of logical block addresses, wherein the first set of logical block addresses comprises logical block addresses after logical block addresses of the second set of logical block addresses.

29. The method of claim 28 further comprising:
prior to transmitting the indication that the host is compatible with the first storage unit, generating a partition for the storage device comprising the second set of logical block addresses but not the first set of logical block addresses after the second storage unit has been initialized.

30. The method of claim 29 further comprising updating the partition for the storage device to include the first set of logical block addresses after the first storage unit has been initialized.

31. The method of claim 27 further comprising loading a device driver on the host to generate the indication.

32. The method of claim 27 further comprising transmitting cache data to the first storage unit and non-cache data to the second storage unit after the first storage unit and the second storage unit have been initialized.

33. The method of claim 27 wherein the first media comprises a solid state memory and the second media comprises a rotating disk.

34. The method of claim 27 wherein the indication comprises a signature.

35. A non-transitory machine readable medium comprising instructions which when executed by a processor, initializes a storage device configured to communicate with a host, wherein the storage device comprises a first storage unit comprising a first media of a first type, and a second storage unit comprising a second media of a second type different than the first type, and a controller, the processor initializing the storage device by at least:
initializing the second storage unit;
transmitting an indication to the controller of the storage device indicating that the host is compatible with the first storage unit;
receiving an identification of the first storage unit from the controller; and
initializing the first storage unit in response to receiving the identification of the first storage unit.

36. The non-transitory machine readable medium of claim 35 wherein the first media comprises a first set of logical block addresses, and the second media comprises a second set of logical block addresses, wherein the first set of logical block addresses comprises logical block addresses after logical block addresses of the second set of logical block addresses.

37. The non-transitory machine readable medium of claim 36 further comprising:
prior to transmitting the indication that the host is compatible with the first storage unit, generating a partition for the storage device comprising the second set of logical block addresses but not the first set of logical block addresses after the second storage unit has been initialized.

38. The non-transitory machine readable medium of claim 37 further comprising updating the partition for the storage device to include the first set of logical block addresses after the first storage unit has been initialized.

39. The non-transitory machine readable medium of claim 35 further comprising loading a device driver on the host to generate the indication.

40. The non-transitory machine readable medium of claim 35 further comprising transmitting cache data to the first storage unit and non-cache data to the second storage unit after the first storage unit and the second storage unit have been initialized.

41. The non-transitory machine readable medium of claim 35 wherein the first media comprises a solid state memory and the second media comprises a rotating disk.

42. The non-transitory machine readable medium of claim 35 wherein the indication comprises a signature.

* * * * *